United States Patent
Leicht

(10) Patent No.: US 6,354,759 B1
(45) Date of Patent: Mar. 12, 2002

(54) CONNECTOR FOR FRAME MEMBERS

(76) Inventor: Frank Leicht, 4517 W. Grove, Skokie, IL (US) 60076

(*) Notice: Subject to any disclaimer, the term of this patent is extended or adjusted under 35 U.S.C. 154(b) by 0 days.

(21) Appl. No.: 09/396,811

(22) Filed: Sep. 14, 1999

(51) Int. Cl.[7] ............................. B25G 3/36; E04G 7/00; F16B 7/00
(52) U.S. Cl. ..................... 403/403; 403/363; 403/409.1
(58) Field of Search ................... 403/403, 381, 403/367, 293, 334, 331, 363, 409.1; 108/192; 5/9.1

(56) References Cited

U.S. PATENT DOCUMENTS

| | | | | |
|---|---|---|---|---|
| 3,858,996 A | * | 1/1975 | Jarvis | ........................ 403/353 |
| 3,999,878 A | * | 12/1976 | Robinson | ..................... 403/407 |
| 4,144,689 A | * | 3/1979 | Bains | ........................... 52/285 |
| 4,646,497 A | * | 3/1987 | Hoenle | ......................... 52/285 |
| 4,815,242 A | * | 3/1989 | Gilliland | ......................... 52/90 |
| 5,158,392 A | * | 10/1992 | Takeda | ..................... 403/405.1 |
| 5,244,300 A | * | 9/1993 | Perreira et al. | ............. 403/381 |
| 5,622,444 A | * | 4/1997 | Gronnevik | .................. 403/316 |
| 5,860,759 A | * | 1/1999 | Leicht | ........................ 403/334 |

* cited by examiner

Primary Examiner—Lynne H. Browne
Assistant Examiner—John B. Walsh
(74) Attorney, Agent, or Firm—Paul H. Gallagher

(57) ABSTRACT

A connector made of two pieces, each piece being a single one-piece stamping, the pieces having mutually engaging hooks forming camming elements. The pieces are mounted on the exterior surfaces of the members of the frame to be connected. The connectors at certain locations in the frame are opposite and symmetrical, but otherwise identical in construction.

7 Claims, 3 Drawing Sheets

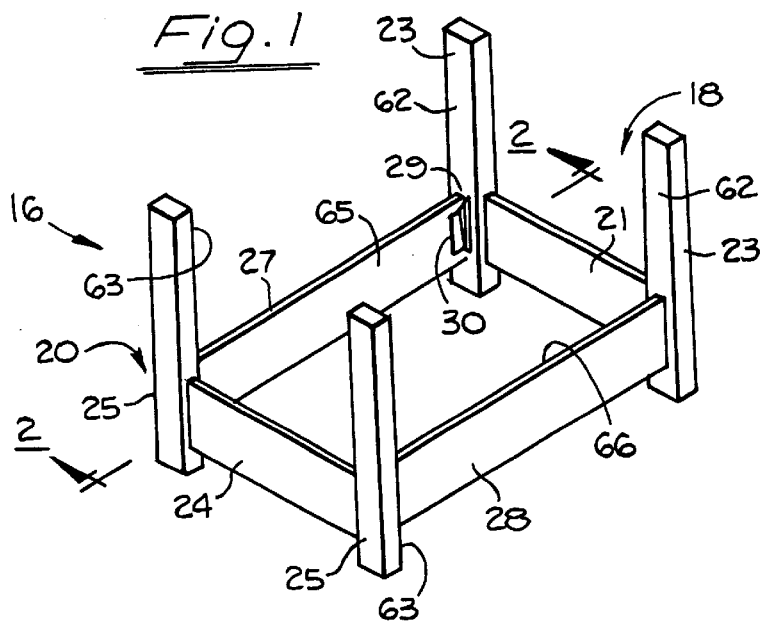
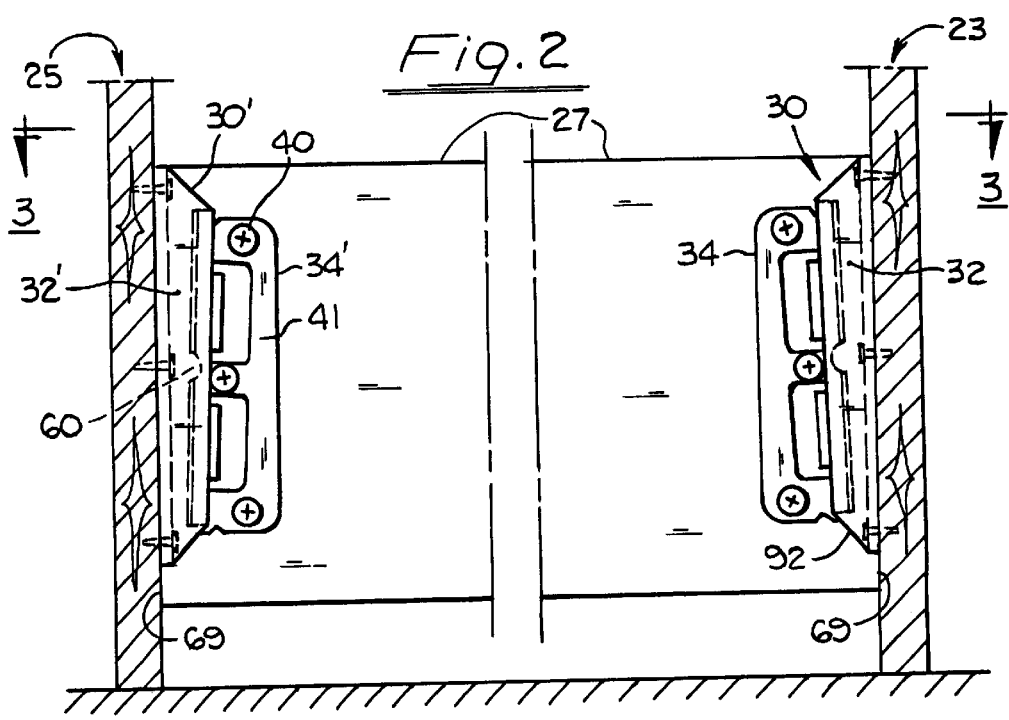
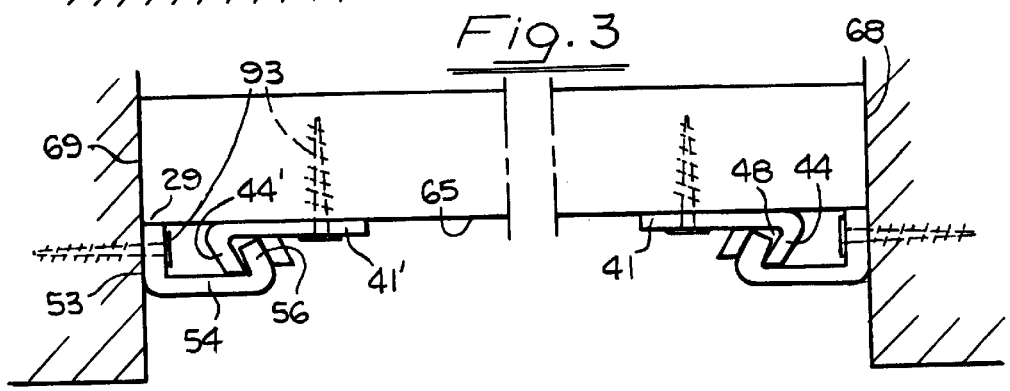

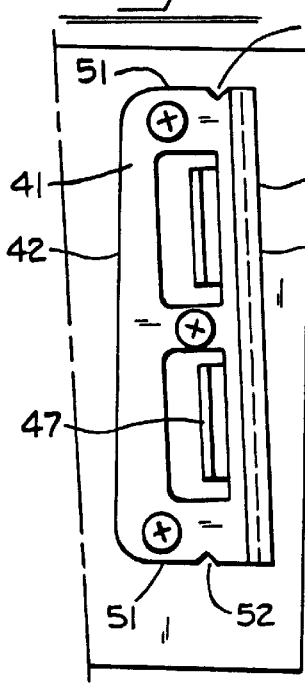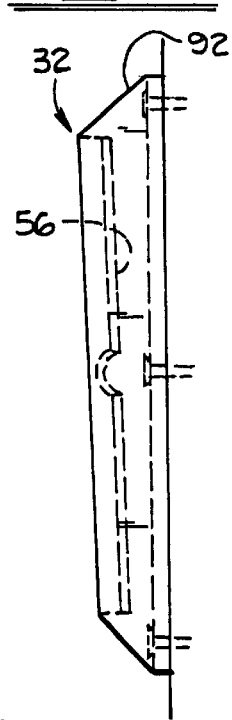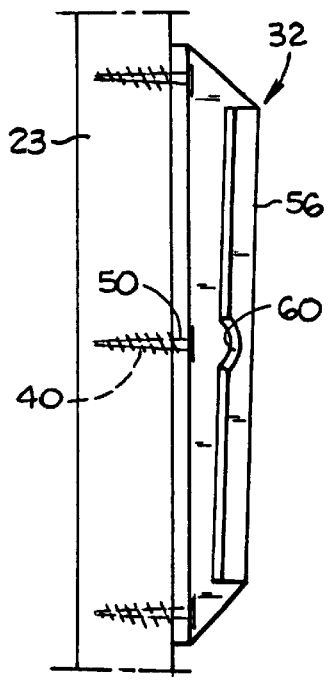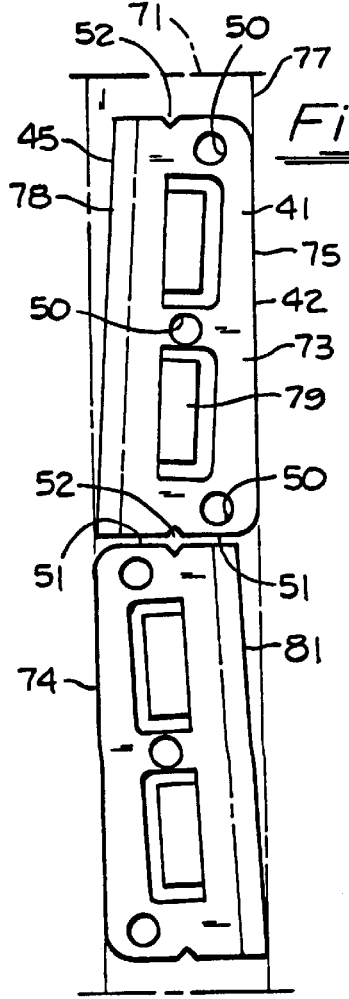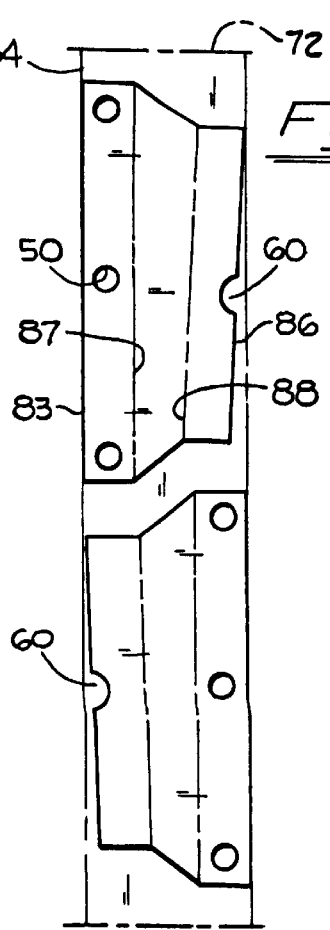

CONNECTOR FOR FRAME MEMBERS

SUMMARY OF THE INVENTION

The invention resides in the field of the connectors for detachably interconnecting frame members, such as wooden frame members. Record is made of my prior U.S. Pat. No. 5,860,759, issued Jan. 19, 1999, directed to a connector in this general field.

A very common example of such frame members is bed frame members, but the device is usable in connection with other kinds of frames as well.

As is generally known, bed frames include a head board, a foot board, and rails interconnecting the head board and the foot board.

A principal object of the invention is to provide a device of this general character that is particularly adaptable to pieces of wood of various thicknesses. Certain bed frames, and particularly the rails thereof are often made of relatively thin pieces, which renders it more difficult to apply frame connectors thereto, and the present connector is applied entirely to the exterior surface of the frame members and thus easily applied to thin pieces.

Another object is to provide such a device minimizing the requirement for accuracy in dimensions, thereby reducing the cost of manufacture thereof.

Still another object is to provide a connector of the type just referred to, which, when applied to the members of the frame and are interconnected, form a solid and firm connection, eliminating any looseness between the members.

BRIEF DESCRIPTIONS OF THE INDIVIDUAL FIGURES OF THE DRAWING

FIG. 1 is a perspective view of a bed frame, in which the connector of the invention is utilized.

FIG. 2 is a view oriented according to the line 2—2 of FIG. 1.

FIG. 3 is a view looking down on FIG. 2 as indicated by the line 3—3 of FIG. 2.

FIG. 4 is a face view of the connector piece at the right of FIG. 2 that is partially hidden in FIG. 2.

FIG. 5 is a side view of the connector piece at the right of FIG. 2 that is in full view.

FIG. 6 is a view of the bracket of FIG. 5 but from the opposite side.

FIG. 7 is a face view of a pair of identical stamped blanks, each to be shaped into one of the pieces of the connector.

FIG. 8 is a face view of a pair of identical stamped blanks, each to be shaped into the other one of the pieces, cooperating with the connector piece from a blank of FIG. 7.

DETAILED DESCRIPTION OF THE DRAWINGS

Figure 9:
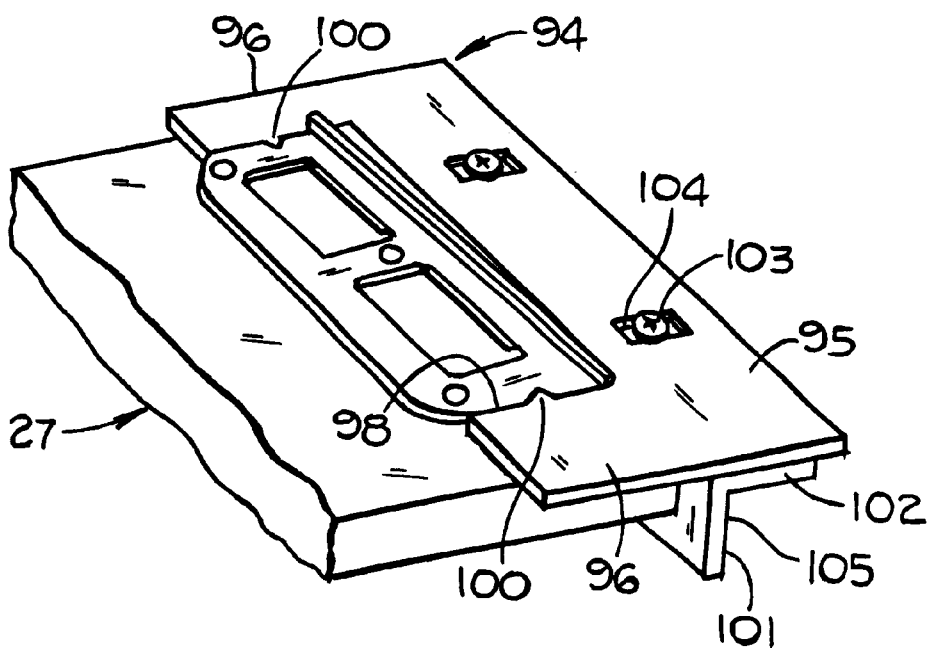
FIG. 9 is a perspective view of a jig used for locating the piece of FIG. 6 to the rail.

FIG. 1 shows a complete bed frame indicated in its entirety at 16, which includes a head board sub frame 18 and a foot board sub frame 20. The sub frame 18 includes a head board 21, and posts 23, while the sub frame 20 includes a foot board 24 and posts 25.

The frame also includes side rails 27, 28 detachably connected between respective posts, while the head board 21 and the foot board 24 are fixedly connected with the corresponding posts. The side rails and the posts form inside corners 29 (FIGS. 1 & 3). A connector is used at each of the four corners of the frame, positioned in the inside corners interconnecting the respective ends of the rails and the corresponding posts. As used in the claims, the posts are referred to as first frame members, and the side rails as second frame members.

The connectors are of two different forms, mutually symmetrical and opposite, but otherwise structurally identical. They are identified 30 and 30' (FIG. 2). All of the parts and elements of the connector 30 are identified in the connector 30' by the same numerals with prime markings. One connector 30 is shown at the far corner of the frame in FIG. 1.

Each connector includes a set of two pieces (FIG. 2), namely, a bracket 32 and a hanger 34, the bracket being mounted on the post and the hanger on the side rail. The connectors at the opposite ends of each rail are symmetrical, and they interact in locking effect, as referred to again hereinbelow.

Additionally the connectors at each end of the frame are of opposite orientation. The complete frame forms a polygon, and the connectors are of alternately and successively opposite orientation in direction circumferentially around the frame.

Referring to the connector 30, each of the two pieces, bracket 32, and hanger 34, is a single one-piece stamping, preferably of steel, and the two pieces contitute the entire connector, except for screws 40 for mounting them.

The hanger 34 is stamped from an originally flat blank and includes a flat mounting plate or back plate 41, having a first edge 42 and a cam element or hook 44 at the opposite, second, edge 45 (FIGS. 4 & 5) inclined to the edge 42. Tangs 47 are cut from the blank. The cam element is shaped in a later step when the tangs are also shaped parallel to the cam elememt, to form a groove 48 (FIG. 3) between the tangs and the cam element. Holes 50 (FIG. 6) are stamped to receive the screws 40.

The end edges 51 (FIG. 4) of the back plate are preferably perpendicular to the first edge 42 and have small indexing notches 52 therein.

The bracket 32, stamped from an originally flat blank, includes a back mounting flange 53 (FIGS. 3, 5) of narrow width, a blade element 54 perpendicular to the flange, and a cam element or hook 56, disposed at an oblique angle to the flange 53. Holes 50 are provided for the mounting screws. The cam element is provided with a notch 60, and the blade element is inclined at the ends at 61 to provide access to the screws in mounting the bracket.

For convenience in referring to the parts, the posts 23 have inner side surfaces 62 and the posts 25 have inner side surfaces 63. Similarly, the side rails 27, 28 have inner side surfaces 65, 66 respectively, and they have end surfaces 68, 69 respectively. These inner surfaces and end surfaces enter into the description hereinbelow, of the mounting of the pieces of the connector to the bed frame.

The side surfaces 62, 63, 65, 66 are referred to as inner with reference to the frame as a whole, but the posts and side rails have exterior surfaces in the interpretation that the surfaces are clear, without indentations.

The brackets 34, 34' are symmetrical, and the hangers 32, 32' are symmetrical also. FIG. 2 shows the brackets mounted on the posts, while the hangers are mounted on the side rail. Further details of this relationship will be referred to again hereinbelow.

FIGS. 7 and 8 show blanks or strips of metal, 71, 72 from which shown in both upper and lower positions, these hanger blanks being symmetrical. In this figure, a cut blank 73 has a straight edge 75 aligned with a side edge 77 of the strip blank 71. On the other side, the blank has an inclined edge 78, and has a pair of the tangs 47 cut from the blank.

The cut blank 74 at the bottom in FIG. 7, is identical with the blank 73, but opposite and symmetrically arranged. The edge 81 of the blank 74 corresponds with the edge 78.

The end edges of the blank are perpendicular to the edges 73 respectively, and in forming the blanks, are cut at position longitudinally in the strip 71, according to known stamping techniques. After the blanks are cut as shown, the side edge 78 is bent over to form the cam element 44 (FIG. 3); then the tangs are bent up to a position parallel with the cam element, leaving the groove 48 for receiving the hook on the corresponding bracket.

FIG. 8 represents the steps in fabricating the brackets 32, 34', which are shown in upper and lower positions. The bracket 34 is represented by a flat blank strip 82, having an edge 83 coinciding with the edge 84 of the strip blank, and an edge 86 at the opposite side, disposed at an oblique angle to the edge 83. The notch 60 (referred to) is cut in the edge 86. A line 88 is shown spaced from and parallel with edge 86, and a line 87 is shown spaced from and parallel with the edge 83. These lines represent the bend lines to form the cam element 56 FIG. 3 and the flange 53. This figure represents two brackets to be cut from a single strip blank 72 and may be positioned close together or spaced apart, according to known stamping techniques.

The two brackets represented in FIG. 7, are oppositely and symmetrically shaped, for corresponding connectors in mounting the rails to the other frame members.

The original flat blank in each of FIGS. 7 and 8 are, when cut from the strips 71, 72, identical and later bent individually to form right hand and left hand pieces. This step is the same in each the brackets and the hangers.

FIG. 2 shows the specific manner of mounting the connector pieces on the frame members. In this figure, the two posts 23, 25 are shown, with their inner surfaces 62, 63 facing each other and with the brackets mounted thereon. These brackets are so mounted, with the flanges 53 fitted to the inside surfaces of the posts, and thus the brackets are mounted in the inside corners 29. The notch 60 and the inclined edges 92 that facilitate in engaging the mounting screws.

The hangers 34, 34' are fitted to the inside surface 65 of the rail, at a position spaced inwardly from the end edges of the rail, as indicated at 93 (FIG. 3, left). It will be observed that the inclination of the edges 78, and 86 is the same (FIG. 2), and in assembling the parts of the frame, the subframes are put in standing position, and a rail poised between two aligned posts at one side, but initially with the posts spaced a short distance from the ends of the rail. When the rail is in this position, the cam elements on the hanger are substantially aligned vertically with the can elements on the brackets, and then the rail is lowered with the hangers engaging the brackets, and due to the inclination referred to, the connector pieces, i.e. hanger and bracket, produce a mutual wedging effect and are thereby moved relatively horizontally until the posts engage the end edges of the rail (FIG. 2).

Both the hangers, and the brackets, are mounted on the inside surfaces of the respective posts and rails. The connector pieces are thus mounted on the exterior surfaces of the frame members as contrasted with mounting the elements or extending them into a groove in a frame member, as disclosed and claimed in the above mentioned patent.

Figure 10:
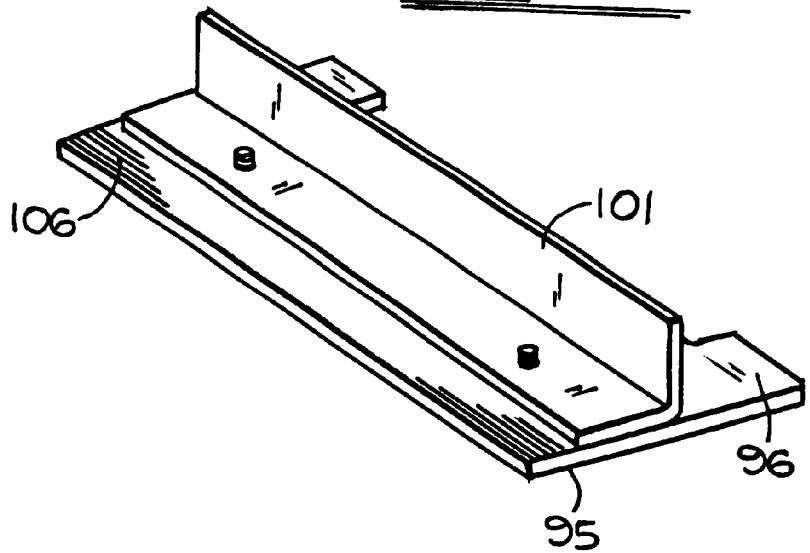
FIG. 10 is a perspective view of the under side of the jig of FIG. 8.

FIGS. 9 and 10 show a jig 94 for use in locating the hangers on the rails and mounting them there. The jig includes a flat plate 95, with legs 96 extending laterally at the ends, forming a large notch 98, the legs having points 100.

The jig also includes an angle piece 101 having one flange 102 fitted to the plate and secured thereto by screws 103 extending through slots 104. The angle piece has a downwardly extending flange 105. The screws enable the angle piece to be adjustably moved toward and from the notch 98.

In using the jig, the top 95 is fitted on the end of the rail 27, with the flange 105 engaging the end edge of the rail. This provides a gage for fitting the hanger in place, which is done by fitting the hanger in the large notch 98 with the indexing notches 52 receiving the points 100. Gage lines 106 are marked on the plate 95 to provide a visual aid in locating the hanger.

What is claimed is:

1. A connector for detachably interconnecting a pair of frame members, the frame members including a first frame member having an inner surface, and a second frame member having an end surface and and inner surface, said surfaces constituting exterior surfaces of the respective frame members, the connector including a first piece and a second piece separate from and independent of the frame members, the first piece having a mounting flange and a first cam element extending perpendicular to the mounting flange, the second piece having a flat mounting plate and a second cam element displaced from the plane of the flat mounting plate, said connector pieces being mounted on said inner surfaces respectively, with the cam elements thereof in interengagement and thereby capable of drawing the frame members together in direction perpendicular to the inner surface of the first frame member, the frame members, when interconnected, being positioned with the end surface of the second frame member engaging the inner surface of the first frame member, thereby forming an inside corner between the two inner surfaces, the mounting plate of the second piece being engageable face-to-face with the inner surface of the second frame member, the construction and arrangement being such that in response to manually moving the second frame member downwardly relative to the first frame member, the cam elements interengage and force the frame members together into interengagements, and such interengagement functioning to limit movement of the connector pieces into connecting position, the cam element of the second piece of the connector includes spaced elements forming a groove there between, the construction being such that the first cam element is received in said groove, thereby preventing the first and second cam element from becoming disengaged in direction parallel with the inner surface of the second frame member.

2. A connector according to claim 1 wherein, the connector pieces are mounted entirely on the exterior of the respective frame members.

3. A pair of connectors according to claim 1 for use with a pair of spaced first frame members and a single second frame member spanning the distance between the first frame members wherein, the first and second pieces of one connector being symmetrical with and opposite to the respective pieces of the other connector.

4. A plurality of pairs of connectors according to claim 3 for use with a plurality of pairs of first frame members and a plurality of second frame members interconnected to form a polygon, whereby, in progressing circumferentially of the polygon, the two pieces in any one connector are symmetrical with and opposite to the respective pieces in the adjacent connectors progressing in either direction.

5. A connector according to claim 1 wherein the inner surface of the first frame member is planar, the second frame member has a longitudinal direction and the end surface thereof is planar and is perpendicular to said longitudinal direction, said planar surfaces are fitted face-to-face when the frame members are secured together, said second connector piece has a rear edge parallel with said end surface and a front edge at an oblique angle relative to said end surface, said second cam element is on said front edge, and the second piece has indexing notches on the end edges perpendicular to the rear edge, operative for receiving points on a jig that is fitted to the second frame member, for positioning the second piece on the second frame member in response to fitting the jig to the second frame member.

6. A connector according to claim 5 in conjunction with said jig wherein, the jig includes a top plate having a main body and legs at the ends extending perpendicularly from the main body, the main body and the legs forming a main notch, and the legs having points extending toward each other into the small notches, the jig including an angle piece secured to the top plate for adjusting movement toward and from the notch, the jig being adapted to be fitted to the second frame member with the angle piece engaging the end edge surface of the second frame member, the parts being adapted for the second connector piece to be fitted in said main notch, for positioning the second connector piece on the second frame member relative to the end edge of the latter, for securement of that connector piece to that frame member.

7. A connector according to claim 6 wherein, the top plate has gage markings thereon in visual association with the angle piece, whereby to assist a user in adjusting the angle piece to correspondingly preposition the second connector on the second frame member.

\* \* \* \* \*